(12) United States Patent
Lee et al.

(10) Patent No.: US 10,837,593 B2
(45) Date of Patent: Nov. 17, 2020

(54) SUPPORTING STAND

(71) Applicant: SYNCMOLD ENTERPRISE CORP., New Taipei (TW)

(72) Inventors: Jen-Yi Lee, New Taipei (TW); Ming-Chih Shih, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 16/514,381

(22) Filed: Jul. 17, 2019

(65) Prior Publication Data

US 2020/0025329 A1    Jan. 23, 2020

Related U.S. Application Data

(60) Provisional application No. 62/699,289, filed on Jul. 17, 2018.

(51) Int. Cl.
| | |
|---|---|
| *F16M 11/00* | (2006.01) |
| *F16M 11/10* | (2006.01) |
| *F16M 11/18* | (2006.01) |
| *F16M 11/20* | (2006.01) |
| *F16M 11/22* | (2006.01) |

(52) U.S. Cl.
CPC .......... *F16M 11/10* (2013.01); *F16M 11/18* (2013.01); *F16M 11/2021* (2013.01); *F16M 11/22* (2013.01); *F16M 2200/021* (2013.01)

(58) Field of Classification Search
CPC ............... F16M 11/00; F16M 11/2035; F16M 11/2021; F16M 11/12; F16M 11/22
See application file for complete search history.

(56) References Cited

U.S. PATENT DOCUMENTS

| | | | | |
|---|---|---|---|---|
| 7,520,800 | B2 * | 4/2009 | Duescher | B24D 11/001 |
| | | | | 451/527 |
| 10,037,057 | B2 * | 7/2018 | Schafer | F16M 13/005 |
| 2014/0047672 | A1 * | 2/2014 | Saito | G06F 1/1681 |
| | | | | 16/341 |
| 2017/0034067 | A1 * | 2/2017 | Schrum, Jr. | H04L 47/365 |

FOREIGN PATENT DOCUMENTS

CN              204805876 U      11/2015

\* cited by examiner

*Primary Examiner* — Amy J. Sterling
(74) *Attorney, Agent, or Firm* — Muncy, Geissler, Olds & Lowe, P.C.

(57) ABSTRACT

A supporting stand for supporting a panel is provided. The supporting stand comprises a base, a first force module, a one-way bearing, a rotating element, and a second force module. The base includes a bottom board and a first connecting board. The first force module is disposed on the first connecting board and includes a mandrel. The one-way bearing includes a shaft hole for the mandrel disposed therethrough. The rotating element connects with the one-way bearing and the panel so that the panel is capable of rotating at the mandrel along a first rotating direction or a second rotating direction opposite to the first rotating direction. The second force module is disposed on the base and actuated together with the rotating element. When the panel and the rotating element rotate along the first rotating direction, the one-way bearing refrains the first force module from providing a first backward torque to the rotating element.

20 Claims, 12 Drawing Sheets

SUPPORTING STAND

CROSS REFERENCE TO RELATED APPLICATION

This application claims the benefit of U.S. Provisional Application Ser. No. 62/699,289 filed on Jul. 17, 2018. The entirety of the Application is incorporated herein by reference.

BACKGROUND OF THE INVENTION

1. Field of the Invention

The present invention relates to a supporting stand. More particularly, the present invention relates to a supporting stand for connecting with an object and providing different torques on different rotational directions.

2. Description of Related Art

China Patent No. CN 204805876 disclosed a tablet supporting frame having a universal telescopic structure. Owing to the combination of a spherical shell, a hollow sphere, and a magnetic sphere, a panel can be quickly and conveniently adjusted, for example, facing to the counter person for operation, or facing to the customer for confirmation or clicking. However, there is no stopping structure designed in the conventional structure so that the turning operation may be excessive and hard to position. Furthermore, it will be easily wobbling or out of position in long-term operations of finger tapping to the panel.

SUMMARY OF THE INVENTION

The main object of the present invention is to provide a supporting stand for supporting a panel, wherein the supporting stand has a supporting surface facing different directions and having different inclined angles. Particularly, the torque provided by the supporting stand is different when the supporting stand rotates in two different directions.

To achieve the above object, the present invention disclosed a supporting stand for supporting a panel. The supporting stand comprises a base, a first force module, a one-way bearing, a rotating element, and a second force module. The base includes a bottom board and a first connecting board, wherein the first connecting board is disposed on the bottom board. The first force module is disposed on the first connecting board and includes a mandrel. The one-way bearing includes a shaft hole in which the mandrel is disposed. The rotating element is connected to the one-way bearing and the panel, making the panel be capable of rotating around the mandrel in a first rotating direction or a second rotating direction opposite to the first rotating direction. The second force module is disposed on the base and actuated together with the rotating element. The first force module provides a first forward torque and the second force module provides a second forward torque to the rotating element when the panel and the rotating element rotate in the second rotating direction; and when the panel and the rotating element rotate in the first rotating direction, the one-way bearing refrains the first force module from providing a first backward torque, and the second force module is able to provide a second backward torque to the rotating element.

An absolute value of a sum of the first forward torque and the second forward torque is not equal to an absolute value of the second backward torque.

The one-way bearing further includes an outer ring portion and an inner ring portion disposed in the outer ring portion, wherein the shaft hole of the one-way bearing is formed on the inner ring portion, the outer ring portion of the one-way bearing is secured to the rotating element, and the inner ring portion is engaged with the first force module. The inner ring portion is static and the outer ring portion rotates in the first rotating direction with respect to the inner ring portion when the rotating element rotates in the first rotating direction so that the first force module is refrained from providing the first backward torque to the rotating element. The inner ring portion and the outer ring portion of the one-way bearing simultaneously rotate in the second rotating direction when the rotating element rotates in the second rotating direction.

The first force module further includes a shaft sleeve disposed on the mandrel, wherein the shaft sleeve has an outer contour embedding with an inner contour of the shaft hole for engaging the shaft sleeve with the shaft hole.

The base further includes a stopping element, and the rotating element further includes a first stop end and a second stop end, wherein the rotating element is located at a first position when the rotating element rotates in the first rotating direction until the first stop end abuts against the stopping element, and the rotating element is located at a second position when the rotating element rotates in the second rotating direction until the second stop end abuts against the stopping element so that the rotating element is able to rotate and stop at any position between the first position and the second position.

The supporting stand further comprises a cover board being secured to the rotating element for connecting the one-way bearing to the rotating element without shifting from an axis with respect to the rotating element.

The rotating element further includes a coupling shaft aligning with the axis and connecting to the second force module for making the second force module be actuated along with the rotating element.

The rotating element further includes a supporting body for supporting the panel.

The base further comprises a second connecting board disposed on the bottom board and spaced apart from the first connecting board, wherein the second force module is disposed on the second connecting board.

In one embodiment, the first force module further includes a first resistance element connecting to the mandrel, and the second force module further includes a second resistance element actuating along with the rotating element.

The first resistance element is a frictional washer set or a two-way damper.

The second resistance element is a frictional washer set, or a one-way damper, or a two-way damper, or a flathead shaft structure.

In another embodiment, the mandrel is a flathead shaft structure, and the second force module includes a second resistance element actuated together with the rotating element.

The second resistance element is a frictional washer set, a one-way damper, a two-way damper, or a flathead shaft structure.

The present invention further disclosed a supporting stand for supporting a panel on a working surface, wherein the panel has a gravity center. The supporting stand comprises a base, a first force module, a one-way bearing, a rotating element, and a second force module. The base includes a first supporting surface, a second supporting surface, and a first connecting board, wherein the first supporting surface and the working surface include a first angle, and the second supporting surface and the working surface include a second angle which is unequal to the first angle. The first connecting board is disposed on the first supporting surface and the second supporting surface. The first force module is disposed on the first connecting board and including a mandrel. The one-way bearing includes a shaft hole in which the mandrel is disposed. The rotating element is connected to the one-way bearing and the panel, making the panel be capable of rotating in a first rotating direction or a second rotating direction opposite to the first rotating direction with respect to the mandrel. The rotating element connects with the one-way bearing at a connecting point, so that the panel is capable of rotating in a first rotating direction or a second rotating direction opposite to the first rotating direction with respect to the mandrel and the connecting point deviates from the center of gravity. The second force module is disposed on the base and actuating along with the rotating element. The first force module provides a first forward torque and the second force module provides a second forward torque to the rotating element when the panel and the rotating element rotate in the second rotating direction, and when the panel and the rotating element rotate in the first rotating direction, the one-way bearing refrains the first force module from providing a first backward torque, and the second force module is able to provide a second backward torque to the rotating element.

An absolute value of a sum of the first forward torque and the second forward torque is not equal to an absolute value of the second backward torque.

The one-way bearing further has an outer ring portion and an inner ring portion disposed in the outer ring portion; wherein the shaft hole of the one-way bearing is formed on the inner ring portion, the outer ring portion of the one-way bearing is secured to the rotating element, and the inner ring portion is engaged with the first force module. The inner ring portion is static and the outer ring portion rotates in the first rotating direction with respect to the inner ring portion when the rotating element rotates in the first rotating direction so that the first force module is refrained from providing the first backward torque to the rotating element. The inner ring portion and the outer ring portion of the one-way bearing simultaneously rotate in the second rotating direction when the rotating element rotates in the second rotating direction.

The first force module further includes a shaft sleeve disposed on the mandrel, wherein the shaft sleeve has an outer contour embedding with an inner contour of the shaft hole for engaging the shaft sleeve with the shaft hole.

The base further includes a stopping element, and the rotating element further includes a first stop end and a second stop end, wherein the rotating element is located at a first position when the rotating element rotates in the first rotating direction until the first stop end abuts against the stopping element, and the rotating element is located at a second position when the rotating element rotates in the second rotating direction until the second stop end abuts against the stopping element so that the rotating element is able to rotate and stop at any position between the first position and the second position.

The base further comprises a cover board being secured to the rotating element for connecting the one-way bearing to the rotating element without shifting from an axis with respect to the rotating element.

DETAILED DESCRIPTION OF THE PREFERRED EMBODIMENT

Figure 1:
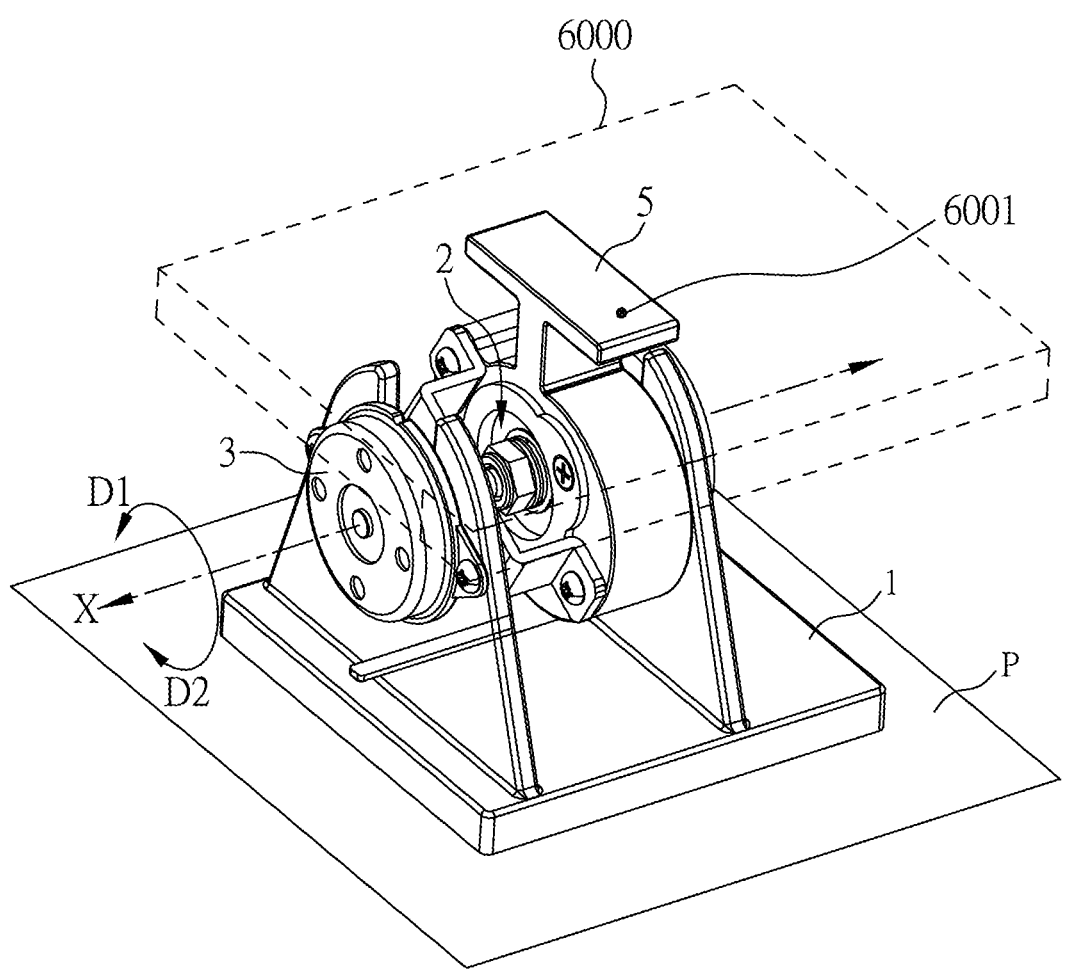
FIG. 1 is a perspective view showing the supporting stand of the first embodiment of the present invention.
Figure 2:
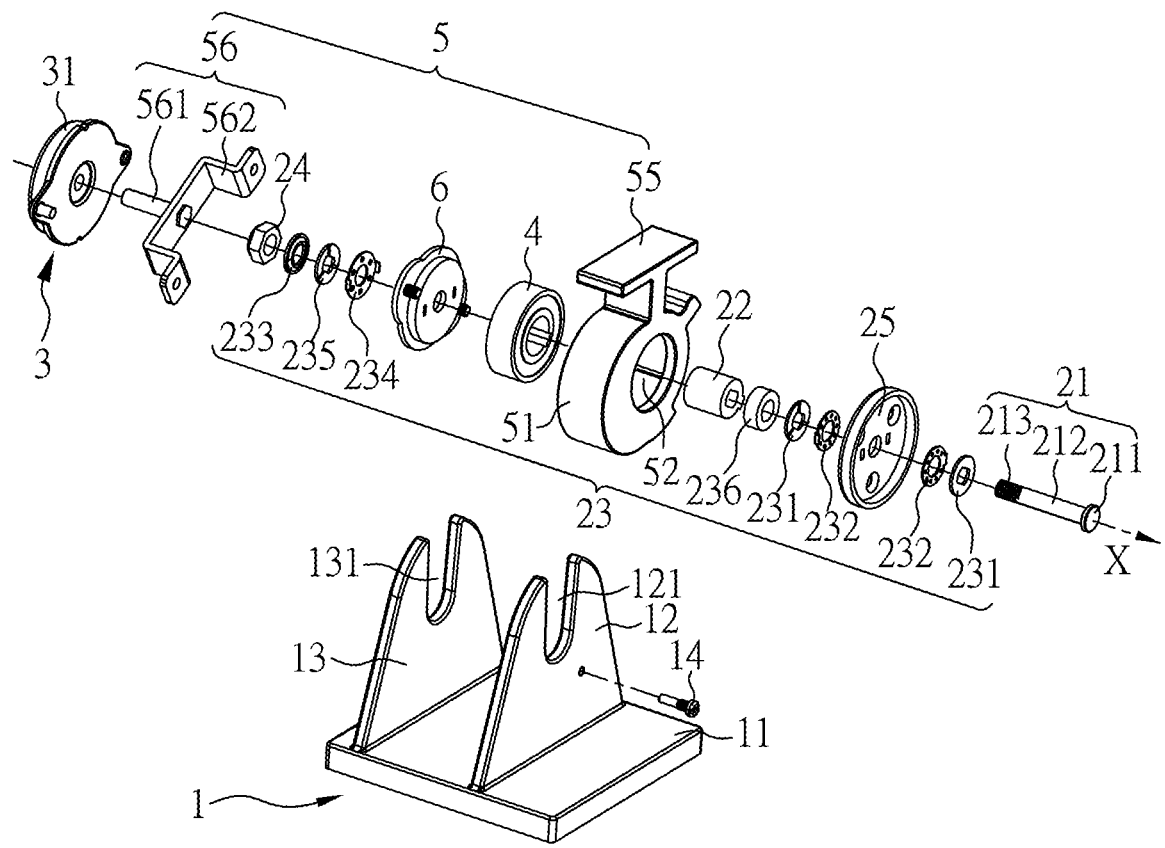
FIG. 2 is an exploded perspective view showing the supporting stand of the first embodiment of the present invention.
Figure 3:
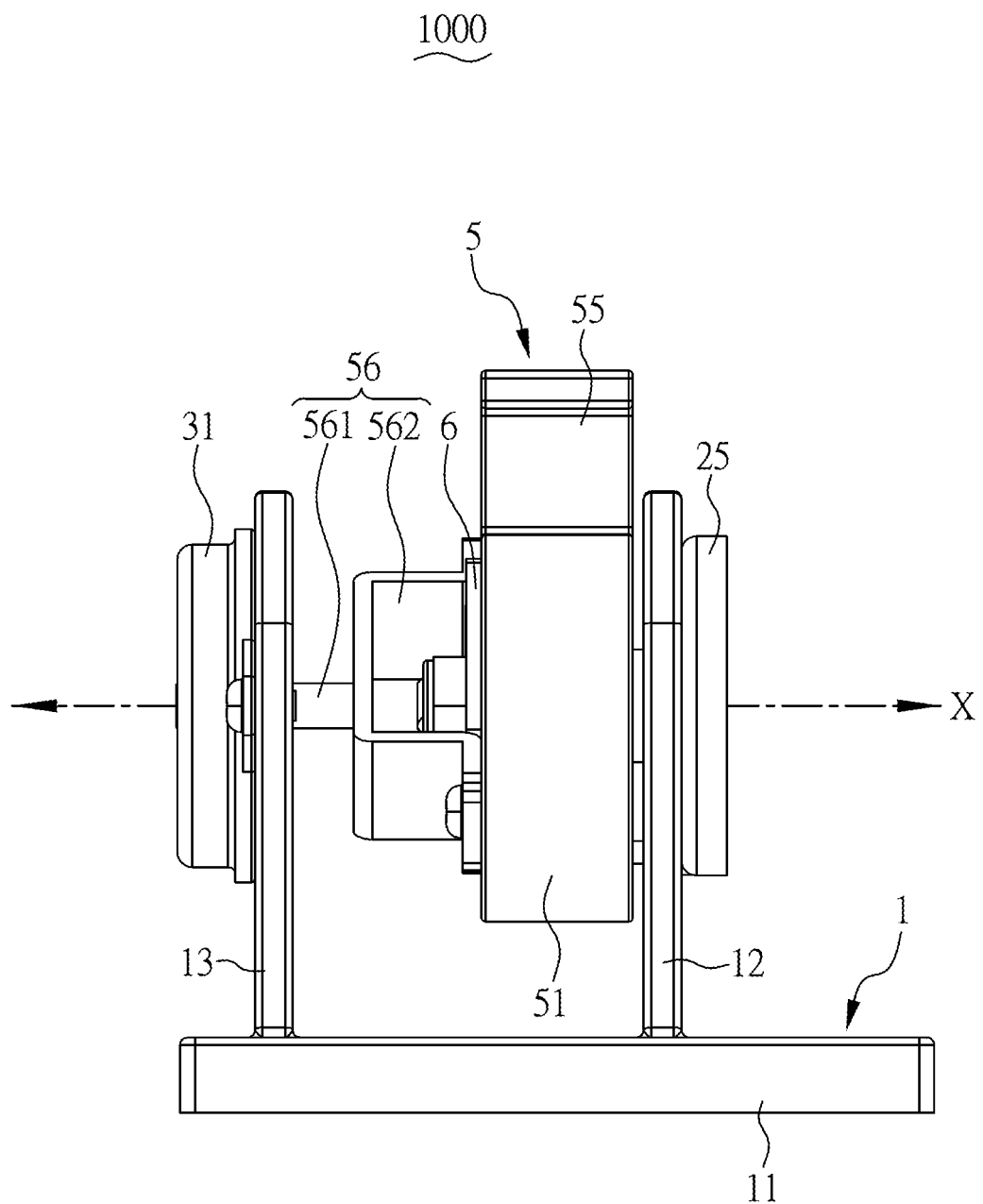
FIG. 3 is a front elevational view showing the supporting stand of the first embodiment of the present invention.

Please refer to FIG. 1 and FIG. 2, which illustrate the perspective view and the exploded perspective view of the supporting stand of the first embodiment of the present invention. The supporting stand 1000 is utilized to support a panel 6000 having a center of gravity 6001 on a working surface P. In other embodiment, the panel 6000 may be a display. The supporting stand 1000 comprises a base 1, a first force module 2, a second force module 3, a one-way bearing 4, a rotating element 5, and a cover board 6. Refer to FIG. 2 and FIG. 3, components other than the base 1, which include the first force module 2, the second force module 3, the one-way bearing 4, the rotating element 5, and the cover board 6 are arranged along a horizontal axis X, configured with each other, and disposed on the base 1, wherein the one-way bearing 4 and the rotating element 5 is disposed between the first force module 2 and the second module 3.

The base 1 further includes a bottom board 11, a first connecting board 12, a second connecting board 13, and a stopping element 14. The first connecting board 12 and the second connecting board 13 are erectly disposed on the bottom board 11 separately. The first connecting board 12 and the second connecting board 13 are spaced apart in an interval from and parallel to each other. A first breach 121 and a second breach 131 formed respectively on the top portions of the first connecting board 12 and the second connecting board 13 away from the bottom board 11. The first force module 2 is disposed on the first breach 121, the second force module 3 is disposed on the second breach 131, wherein the axis X passes through the first breach 121 and the second breach 131. The stopping element 14 is disposed on the first connecting board 12.

As illustrated in FIG. 2, the first force module 2 is disposed on the first connecting board 12 and includes a mandrel 21, a shaft sleeve 22, a first resistance element 23, a nut 24, and a fixing plate 25. The shaft sleeve 22 is sleeved on the mandrel 21 so that the mandrel 21 and the shaft sleeve 22 may rotate synchronously. The first resistance element 23 is sleeved on the mandrel 21, and the nut 24 is screwed onto the mandrel 21. In the present embodiment, the mandrel 21 includes a head portion 211, a rod body 212, and an end portion 213, wherein the head portion 211 is located at the outer side (a side away from the second connecting board 13) of the first breach 121 of the first connecting board 12. The rod body 212 passes through the fixing plate 25 and has a non-circular cross-section. The end portion 213 is threaded externally for engaging the nut 24 which is threaded internally. The components between the head portion 211 and the nut 24 are pressed by both sides because the mandrel 21 and the nut 24 are tightly screwed and the head portion 211 abuts against the fixing plate 25. The first resistance element 23 is a frictional washer set, which includes a plurality of washers 231, 232, 233, 234, 235, and a ring 236. The shape of the through holes of the washers 231, 235 corresponds to the cross-section of the rod body 212, therefore, the washers 231, 235 are actuating along with the mandrel 21. The shape of the through holes of the washers 232, 233 and the ring 236 are circular, therefore, they are not actuating along with the mandrel 21. The washer 234 is fixed to the cover board 6 and actuating along with the rotating element 5. The number, shape, size, and material of the washers may be adjusted as needed.

The second force module 3 is disposed on the second connecting board 13, actuating along with the rotating element 5, and having a second resistance element 31. The second resistance element 31 is a two-way damper. In the orientation of FIG. 2 (and FIG. 5), the two-way damper provides damping force clockwise and counterclockwise.

Figure 5:
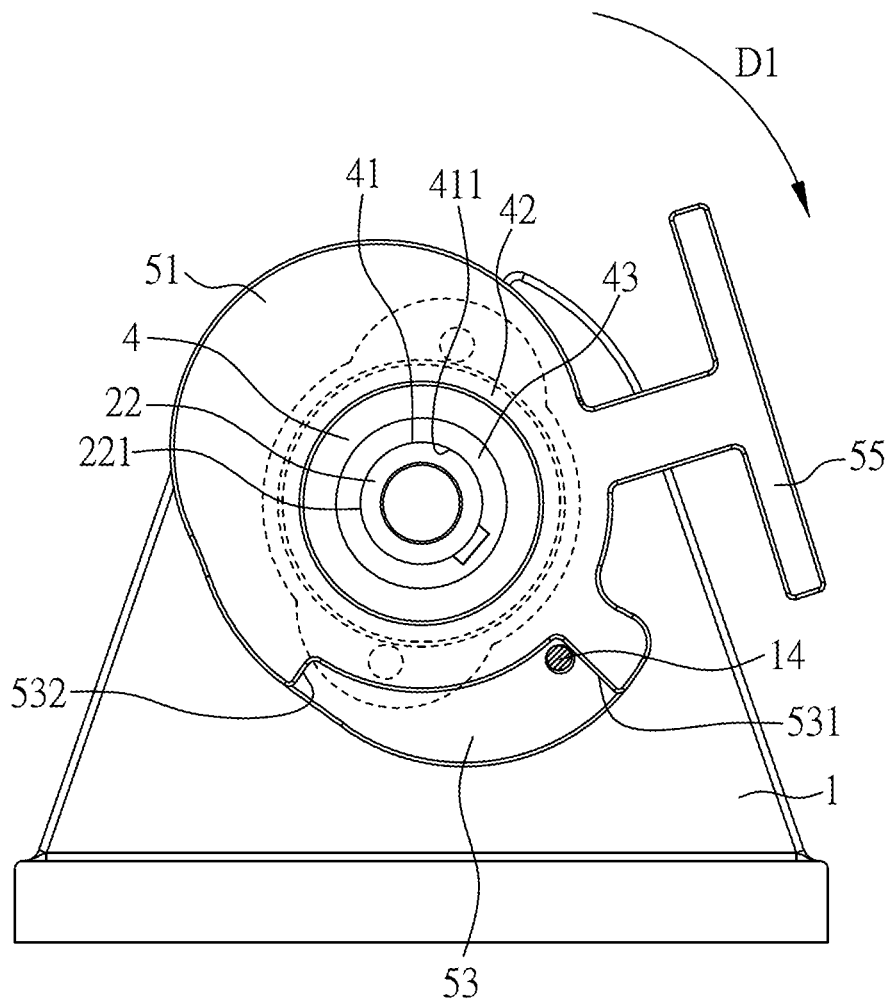
FIG. 5 is a cross-sectional view showing the supporting stand d of the first embodiment of the present invention rotating to the first location along the first rotating direction
Figure 6:
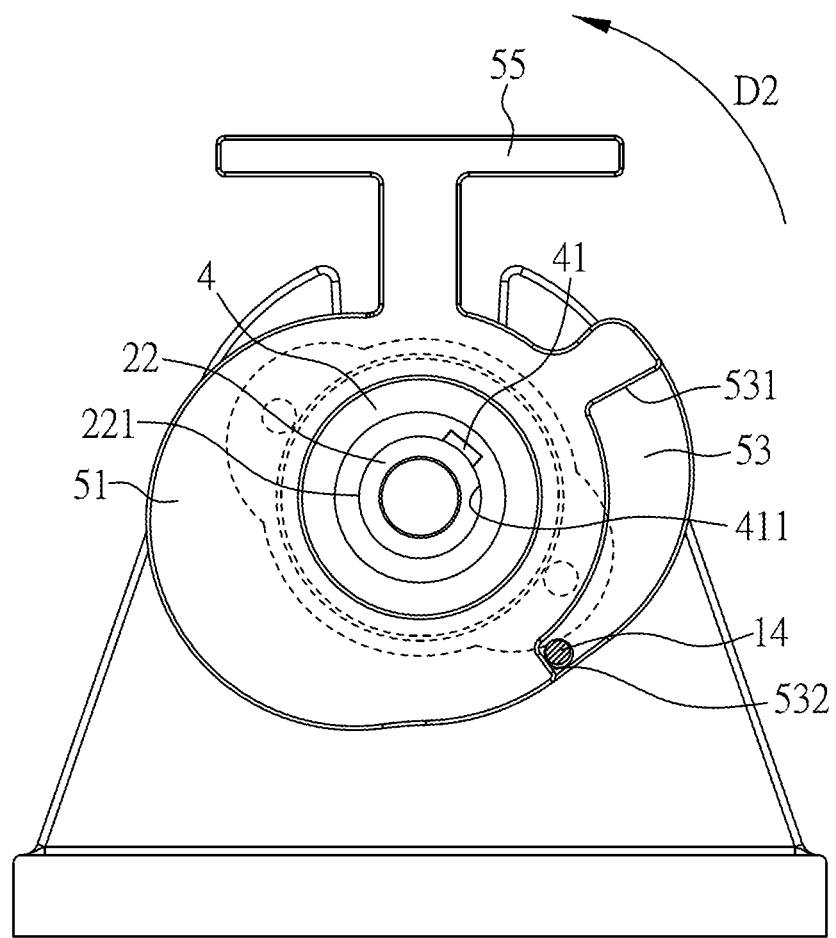
FIG. 6 is a cross-sectional view showing the supporting stand d of the first embodiment of the present invention rotating back to the second location along the second rotating direction

As illustrated in FIG. 5, the one-way bearing 4 includes a shaft hole 41, an outer ring portion 42, and an inner ring portion 43. The shaft hole 41 is formed in the middle of the inner ring portion 43, the outer ring portion 42 is disposed to the rotating element 5, and the inner ring portion 43 is engaged to the first force module 2. The axis of the mandrel 21 overlaps with the axis X. The shaft sleeve 22 has an outer contour 221 embedding with an inner contour 411 of the shaft hole 41, that is, the size and shape of the outer contour 211 and the inner contour 411 are matched with each other for engaging the shaft sleeve 22 with the shaft hole 41. Accordingly, the mandrel 21 of the first force module 2 rotates synchronously with the inner ring portion 43 of the one-way bearing 4. In addition, the inner ring portion 43 is static and the outer ring portion 42 rotates when the mandrel 21 rotates in the first rotating direction D1 (the clockwise direction); and the inner ring portion 43 rotates synchronously with the outer ring portion 42 when the mandrel 21 rotates in the second rotating direction D2 (the counterclockwise direction shown in FIG. 6).

Figure 4:
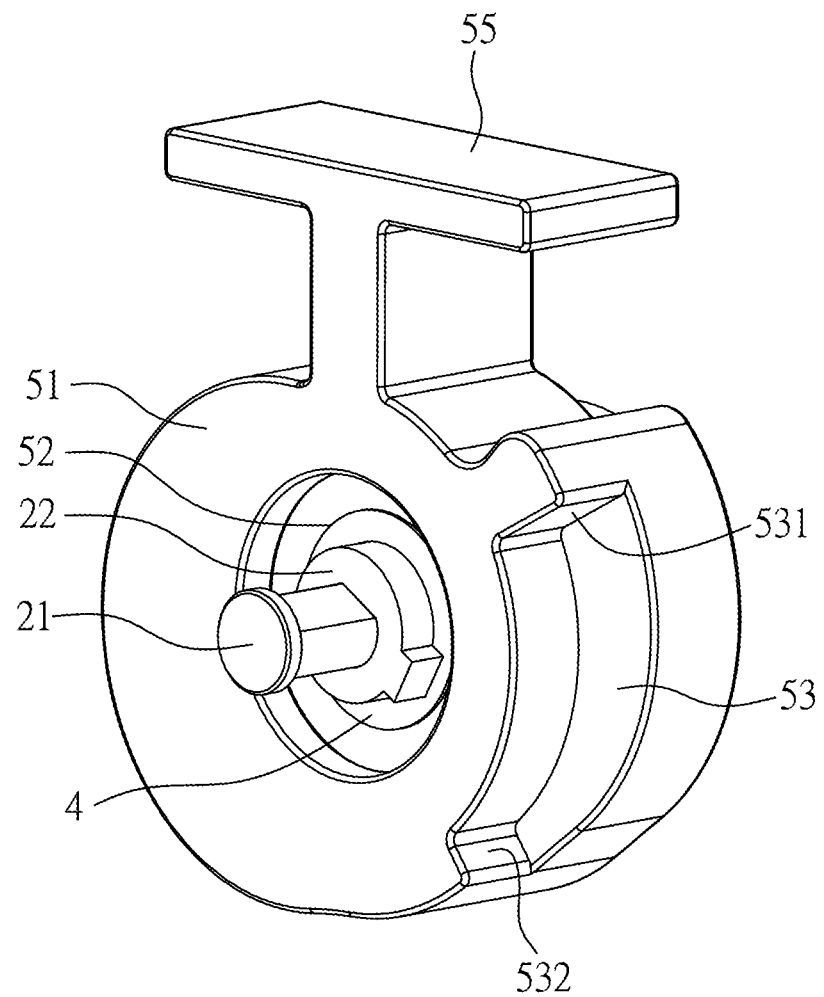
FIG. 4 is a partial perspective view showing the supporting stand of the first embodiment of the present invention.

As illustrated in FIG. 4, the rotating element 5 (in another perspective) is sleeved and fixed on the one-way bearing 4. The rotating element 5 includes a ring-shaped main body 51, a receiving groove 52, a stopping portion 53, a supporting body 55, and an actuating element 56 (refer to FIG. 2). The receiving groove 52 is a through hole that passes through the main body 51 along the axis X, wherein an opening of one side of the receiving groove 52 has a smaller diameter (please refer to FIG. 1 and FIG. 4), and an opening of another side of the receiving groove 52 (the opening near the cover board 6) has a larger diameter. The inner contour of the opening having the larger diameter matches with the outer contour of the outer ring portion 42 of the one-way bearing 4, so that the one-way bearing 4 can be engaged in the receiving groove 52 (refer to FIG. 6). The stopping portion 53 is formed on the main body 51 and having a first stopping end 531 and a second stopping end 532. The stopping ends 531, 532 are disposed with respect to the stopping element 14 for determining a rotatable range of the rotating element 5. In the present embodiment, the stopping portion 53 is a notch, and the first stopping end 531 and the second stopping end 532 are two walls of the notch.

The cover board 6 is fastened to the main body 51 (refer to FIG. 1) and covers the opening with the larger diameter, so that the one-way bearing 4 is maintained in the receiving groove 52 without shifting from the axis X when the rotating element 5 is rotating. The cover board 6 is a gasket in the present embodiment. However, the cover board 6 may be an iron piece in other embodiments.

Figure 7:
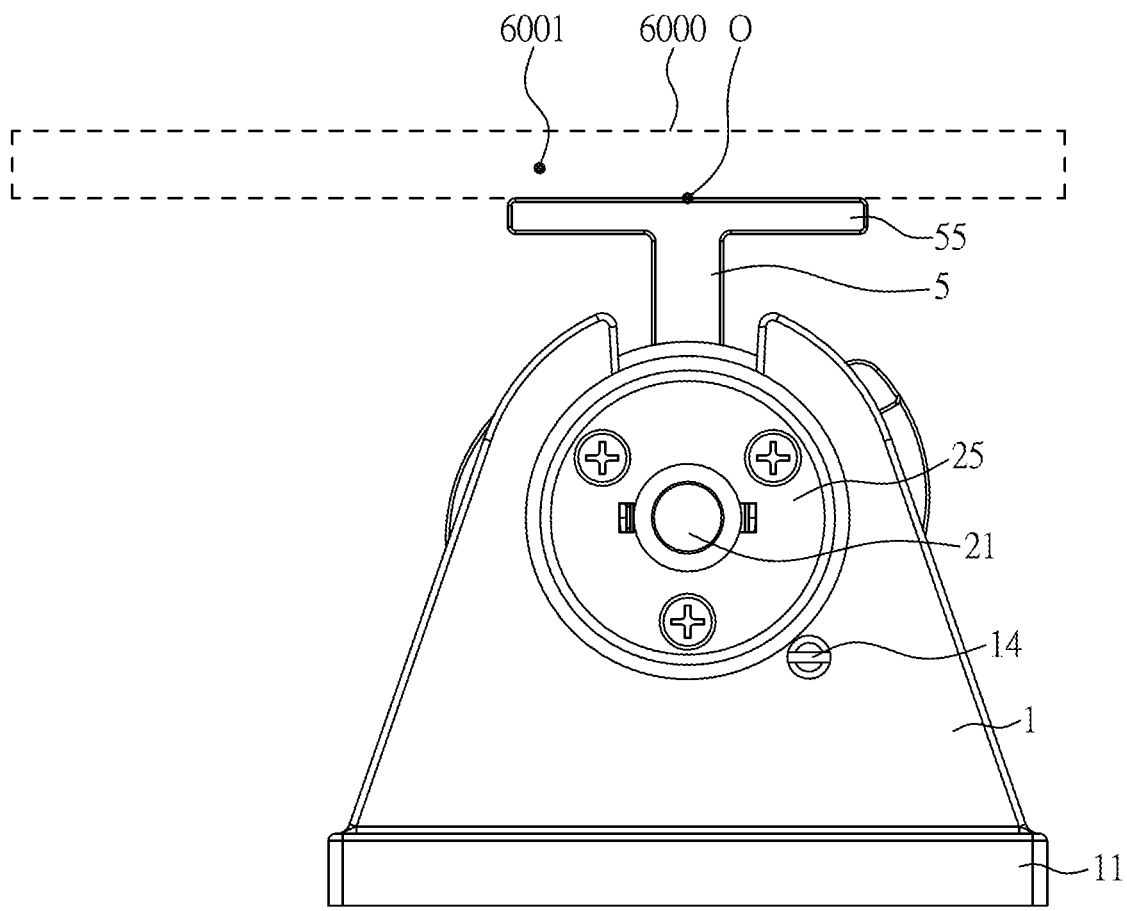
FIG. 7 is an elevational view showing the supporting stand of the first embodiment of the present invention connecting with a panel.

Please refer to FIG. 7, the supporting body 55 supporting the panel 6000 is connected to the panel 6000 at a connecting point O (roughly the center point of the supporting body 55). In the present embodiment, the connecting point O deviates from the center of gravity 6001. The supporting body 55 extends out and away from the first connecting board 12 and the second connecting board 13 to ensure that the panel 6000 is keeping a distance with and do not interfere with the connecting boards 12, 13 respectively. When the rotating element 5 rotates around the axis X in the first rotating direction D1 or in the second rotating direction D2 opposite to the first rotating direction D1, the panel 6000 rotates simultaneously around the axis X. The absolute value of the torque generated by rotating the panel 6000 and the supporting body 55 in the first direction and the absolute value of the torque generated by rotating the panel 6000 and the supporting body 55 in the second direction are different because the connecting point O deviates from the center of gravity 6001. Accordingly, different compensational forces are needed when rotating in opposite directions.

Please refer to FIG. 2, the actuating element 56 has a coupling shaft 561 and a connecting plate 562 roughly configured U-shaped. The coupling shaft 561 is connected to the second resistance element 31 and the axis thereof overlaps with the axis X, thus, the second resistance element 31 is actuated together with the actuating element 56 constantly. The connecting plate 562 is fixed to the main body 51, thus the second resistance element 31 is actuated together with the main body 51 constantly.

The linkage between the first force module 2, the second force module 3, the one-way bearing 4, and the rotating element 5 when the rotating element 5 rotates in the first rotating direction D1 or in the second rotating direction D2 will be described below.

When the rotating element 5 rotates around the axis X in the first rotating direction D1, the inner ring portion 43 stays static and the outer ring portion 42 rotates in the first rotating direction D1 with respect to the inner ring portion 43 (that is, the outer ring portion 42 and the inner ring portion 43 are not actuated with each other). Therefore, the first force module 2 fails to provide a first backward torque A1 because the mandrel 21 of the first force module 2 is not actuated together with the rotating element 5. However, the coupling shaft 561 of the rotating element 5 rotates in the first rotating direction D1 causing the second resistance element 31 (the one-way damper) rotates with respect to the coupling shaft 561, thus, the second force module 3 provides a second backward torque B1 to the rotating element 5. When the rotating element 5 rotates around the axis X in the second rotating direction D2, the inner ring portion 43 and the outer ring portion 42 of the one-way bearing 4 synchronously rotate in the second rotating direction D2 (that is, the outer ring portion 42 and the inner ring portion 43 rotate synchronously) and the mandrel 21 of the first force module 2 is actuated to rotate. Friction force may be generated between the washers 231, 235 rotating with the mandrel 21 and the static washers 232, 233, 234, thus the first force module 2 providing a first forward torque A2 to the rotating element 5. In the meantime, the second force module 3 provides a second forward torque B2 because the coupling shaft 561 of the rotating element 5 rotates in the second rotating direction D2 with respect to the second resistance element 31.

In summary, when the rotating element 5 rotates in the first rotating direction D1, the first force module 2 fails to provide the first backward torque A1 due to the one-way bearing 4, however, the second force module 3 is still able to provide the second backward torque B1. When the rotating element 5 rotates in the second rotating direction D2, the first force module 2 and the second force module 3 separately provide the first forward torque A2 and the second forward torque B2 to the rotating element 5. The different absolute values of the second backward torque B1 and the sum of the first forward torque A2 and the second forward torque B2 provide different compensational forces when the rotating element 5 rotates in opposite directions, and allow the rotating element 5 to be rotated in a consistent manner between a first position and a second position and stop at any position between the first position and the second position.

Please refer to FIG. 5, the rotating element 5 is in the first position when the rotating element 5 rotates in the first rotating direction D1 until the first stop end 531 abuts against the stopping element 14. Please refer to FIG. 6, the rotating element 5 is in the second position when the rotating element 5 rotates in the second rotating direction D2 until the second stop end 532 abuts against the stopping element 14. Accordingly, the position of the rotating element 5 is limited between the first position and the second position.

The supporting stand 2000 of the second embodiment of the present invention is similar to the supporting stand 1000 of the first embodiment except that the mandrel 21 is a flathead shaft structure (the first resistance element 23 is omitted), and the second resistance element 31 is a one-way damper. According to the orientation of FIG. 8, the one-way damper provides resistance in the clockwise direction.

Figure 8:
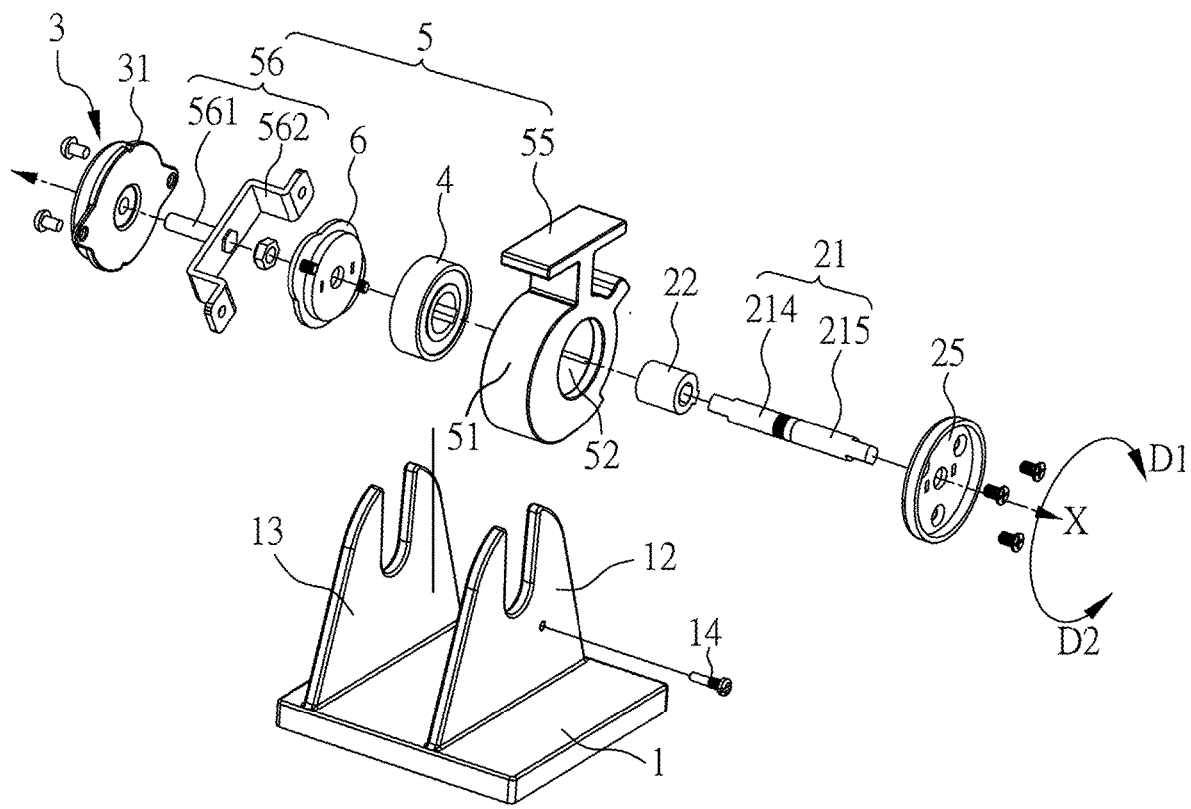
FIG. 8 is an exploded perspective view showing the supporting stand of the second embodiment of the present invention.

The supporting stand 2000 of the second embodiment of the present invention is illustrated in FIG. 8. The mandrel 21 is composed of a male shaft 214 and a female shaft 215 corresponding to the male shaft 214. The male shaft 214 has a convex pillar (not shown in figures), and the female shaft 215 has a concave hole (not shown in figures) corresponding to the convex pillar at the joint of the male shaft 214 and the female shaft 215. In the present embodiment, the male shaft 214 passes through the shaft sleeve 22 with one end fastened to the nut 24; the female shaft 215 is fixed to the first connecting board 12 through the fixing plate 25. When the male shaft 214 rotates with respect to the female shaft 215, a resistance is generated due to the interference between the outer diameter of the male shaft 214 and the inner diameter of the female shaft 215. In other embodiment, the position of the male shaft 214 and the female shaft 215 may swap with each other, for instance, the female shaft 215 passes through the shaft sleeve 22 and is fastened to the nut 24 while the male shaft 214 is fixed to the first connecting board 12.

The linkage between the first force module 2, the second module 3, the one-way bearing 4, and the rotating element 5 is described below.

When the rotating element 5 rotates around the axis X in the first rotating direction D1, the inner ring portion 43 is static and the outer ring portion 42 rotates in the first rotating direction with respect to the inner ring portion 43 (that is, the outer ring portion 42 and the inner ring portion 43 are not actuated together), thus, the mandrel 21 of the first force module 2 is not actuated with the rotating element 5. Accordingly, no resistance is generated between the male shaft 214 and the female shaft 215. However, the second force module 3 provides a second backward torque B1 to the coupling shaft 561 when the coupling shaft 561 of the rotating element 5 rotates in the first rotating direction D1 with respect to the second force module 3 (one-way damper). When the rotating element 5 rotates in the second rotating direction D2, the inner ring portion 43 and the outer ring portion 42 of the one-way bearing 4 synchronously rotate in the second rotating direction D2 (that is, the outer ring portion 42 and the inner ring portion 43 are actuated together with each other). Thus, the male shaft 214 of the mandrel 21 of the first force module 2 is actuated to rotate with respect to the female shaft 215 so that a first forward torque A2, generated by the interferes between the convex pillar of the male shaft 214 and the concave hole of the female shaft 215, is provided to the rotating element 5. At the meantime, the coupling shaft 561 rotates in the second rotating direction D2 and so that the second resistance element 31 of the second force module 3 provides a second forward torque B2 to the rotating element 5. In the present embodiment, the absolute value of the second forward torque B2 is zero.

In summary, the rotating element 5 encounters the second backward torque B1 provided by the second force module 3 when rotating in the first rotating direction D1; the rotating element 5 encounters the first forward torque A2 provided by the first force module 2 and the second forward torque B2 (the absolute value of B2 is zero, which is negligible) provided by the second force module 3.

Figure 9:
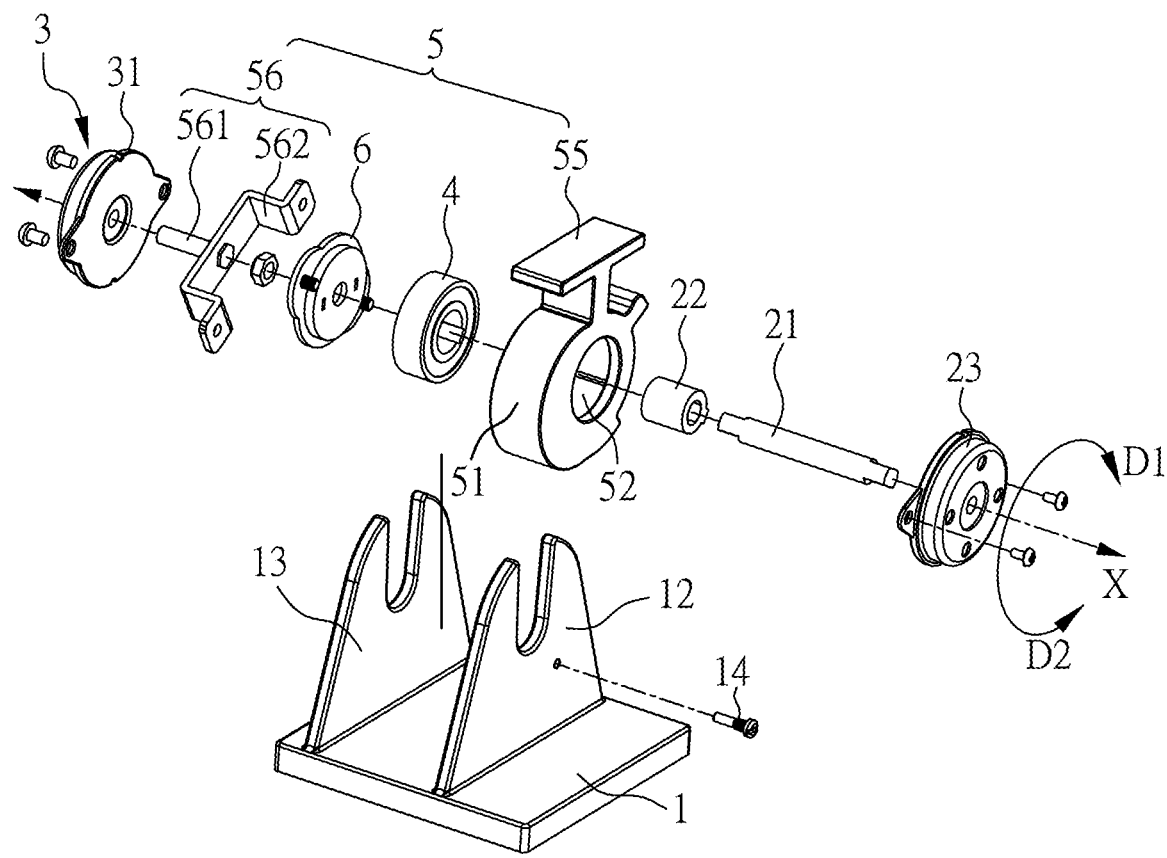
FIG. 9 is an exploded perspective view showing the supporting stand of the third embodiment of the present invention.

The supporting stand 3000 of the third embodiment of the present invention is similar to that of the first embodiment, except that the first resistance element 23 is a two-way damper (without any washer) and the second resistance element 31 is a one-way damper. In the orientation of FIG. 9, the one-way damper provides resistance in the clockwise direction.

The supporting stand 3000 is illustrated in FIG. 9, wherein the mandrel 21 passes through the sleeve shaft 22 with one end fastened to the nut 24 and another end connected to the first resistance element 23. Accordingly, the first resistance element 23 actuated together with the main body 51.

The linkage between the first force module 2, the second force module 3, the one-way bearing 4, and the rotating element 5 of the third embodiment is described below.

When the rotating element 5 rotates around the axis X in the first rotating direction D1, the inner ring portion 43 is static and the outer ring portion 42 rotates in the first rotating direction with respect to the inner ring portion 43 (that is, the outer ring portion 42 and the inner ring portion 43 are not actuated together), thus, the mandrel 21 of the first force module 2 is not actuated together with the rotating element 5. Accordingly, the first backward torque A1 is not generated by the first force module 2. However, the second force module 3 (one-way damper) provides a second backward torque B1 to the coupling shaft 561 when the coupling shaft 561 of the rotating element 5 rotates in the first rotating direction D1 with respect to the second force module 3. When the rotating element 5 rotates in the second rotating direction D2, the inner ring portion 43 and the outer ring portion 42 of the one-way bearing synchronously rotate in the second rotating direction D2 (that is, the outer ring portion 42 and the inner ring portion 43 are actuated together with each other). The mandrel 21 of the first force module 2 is actuated and rotates in the second rotating direction D2 with respect to the first resistance element 23, thus, a first forward torque A2 generated by the first resistance element 23 is provided to the rotating element 5. At the meantime, the coupling shaft 561 rotates in the second rotating direction D2 so that the second resistance element 31 of the second force module 3 provides a second forward torque B2 to the rotating element 5. In the present embodiment, the absolute value of the second forward torque B2 is zero.

In summary, the rotating element 5 encounters the second backward torque B1 provided by the second force module 3 when rotating in the first rotating direction D1; the rotating element 5 encounters the first forward torque A2 provided by the first force module 2 and the second forward torque B2 provided by the second force module 3.

Figure 10:
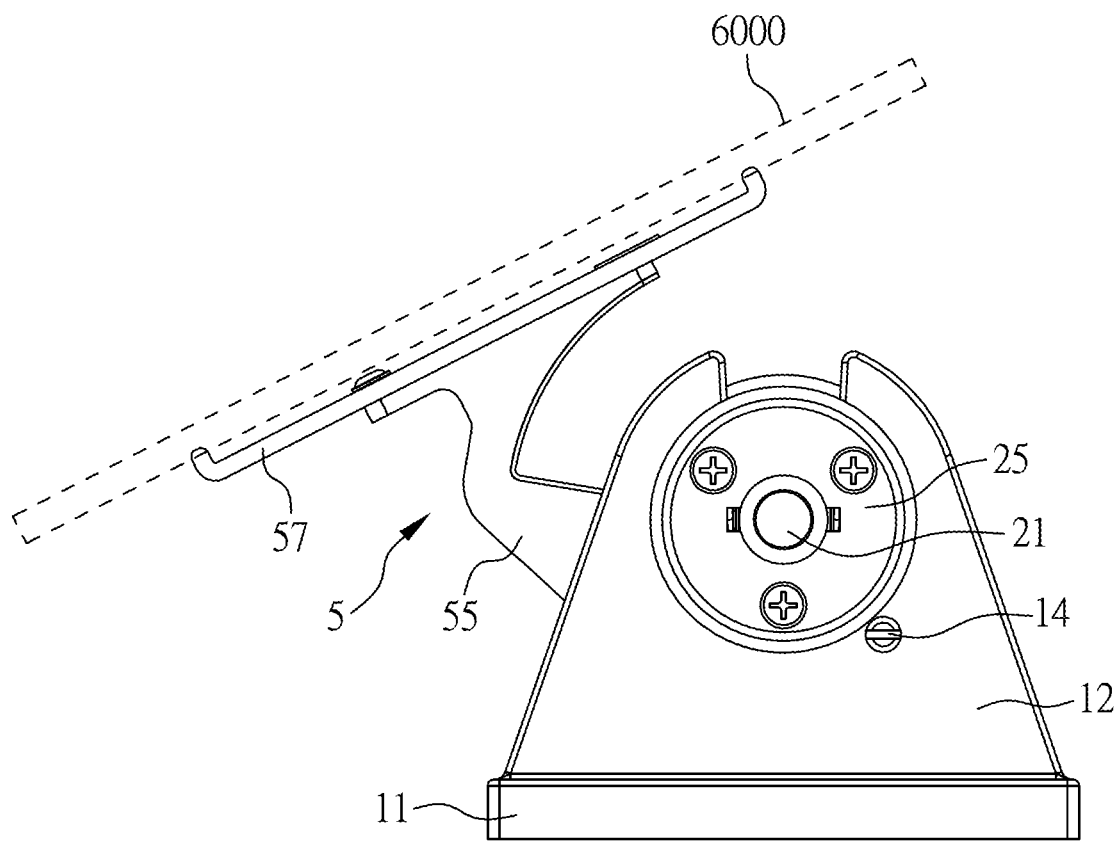
FIG. 10 is an elevational view showing the supporting stand of the fourth embodiment of the present invention connecting with a panel.

The supporting stand 4000 of the fourth embodiment of the present invention is illustrated in FIG. 10. The only difference thereof from the supporting stand 1000 of the first embodiment is the shape of the rotating element 5. The supporting body 55 of the rotating element 5 extends to the left side and bends upwardly. The rotating element 5 further has a carrying plate 57 disposed on the supporting body 55, wherein the carrying plate 57 is located between the panel 6000 and the supporting body 55 so that the panel 6000 is capable of being placed stably on the rotating element 5.

The supporting stand 5000 of the fifth embodiment of the present invention is similar to that of the fourth embodiment, except that the base 1 does not include the bottom plate 11, wherein the bottom plate 11 is replaced by two supporting surfaces.

Figure 11:
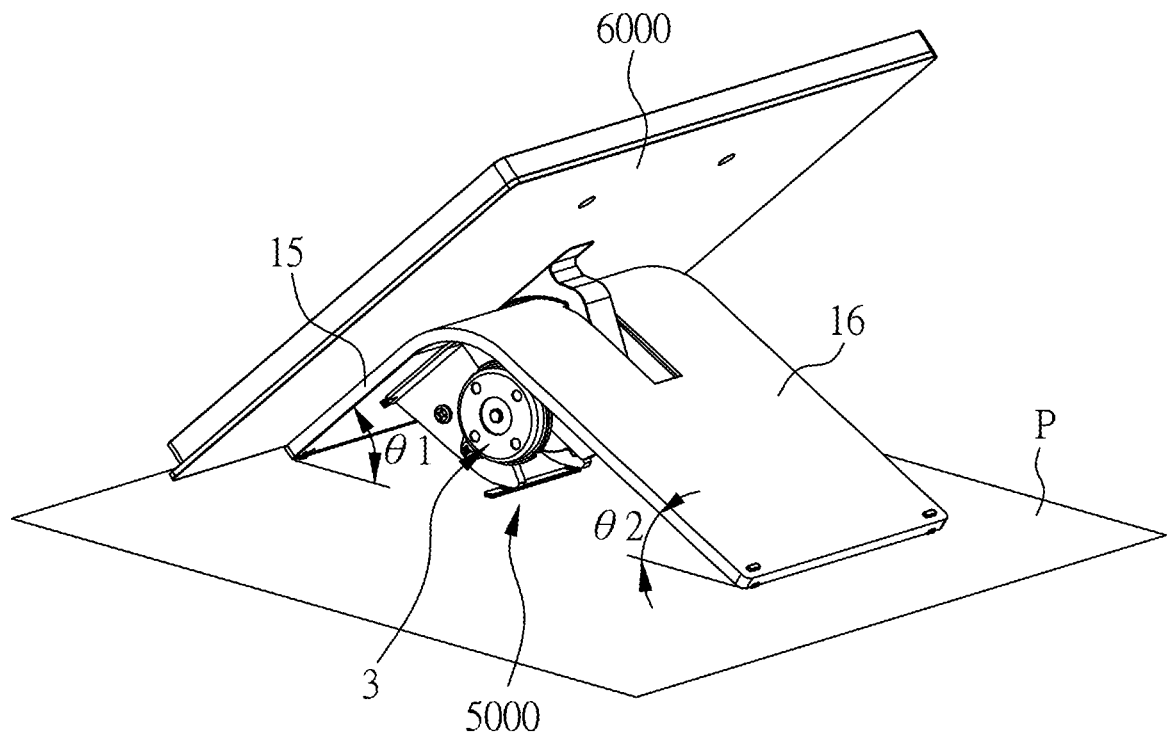
FIG. 11 is a perspective view showing the supporting stand of the fifth embodiment of the present invention connecting with a panel.
Figure 12:
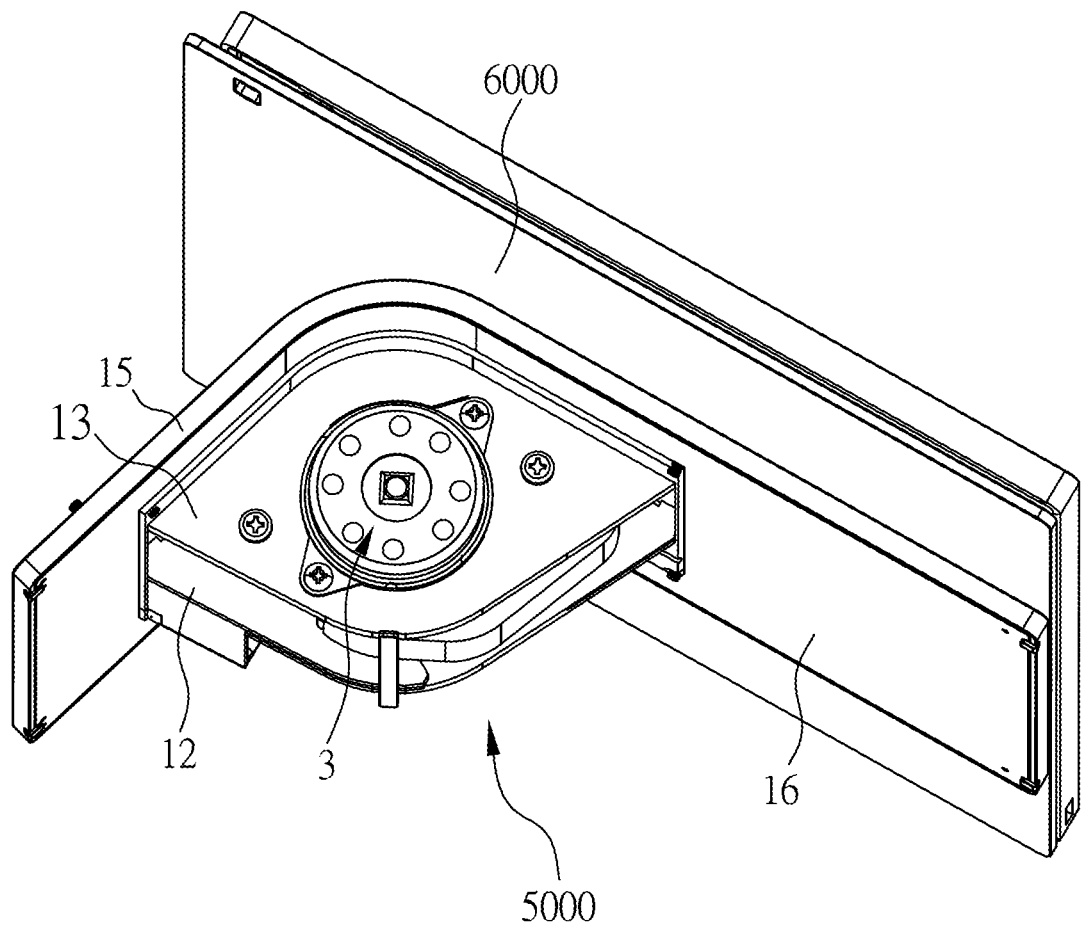
FIG. 12 is another perspective view showing the supporting stand of the fifth embodiment of the present invention connecting with a panel.

Please refer to FIG. 11 and FIG. 12, the base 1 of the present embodiment includes a first supporting surface 15, a second supporting surface 16, a first connecting board 12, and a second connecting board 13. The supporting stand 5000 of the present embodiment stands on a working surface P through the first supporting surface 15 and the second supporting surface 16. The first supporting surface 15 and the second supporting surface 16 are connected to each other and including an angle smaller than 180°. The first supporting surface 15 and the working surface P includes a first angle θ1, the second supporting surface 16 and the working surface P includes a second angle θ2, wherein the first angle θ1 does not equal to the second angle θ2, and values of the first angle θ1 and the second angle θ2 do not equal to zero. The first connecting board 12 and the second connecting board 13, which are simultaneously disposed on the first supporting surface 15 and the second supporting surface 16, are spaced in an interval from each other.

It should be noted that if the second resistance element 31 is a one-way damper, the absolute value of the second forward torque B2 generated when the coupling shaft 561 rotates in the second rotating direction D2 is zero. If the second resistance element 31 is the frictional washer set or the two-way damper or the flathead shaft structure, the absolute value of the second backward torque B1 generated when the coupling shaft 561 rotates in the first rotating direction D1 is not zero, and the absolute value of the second forward torque B2 generated when the coupling shaft 561 rotates in the second rotating direction D2 is not zero.

In addition, in one embodiment, the second resistance element 31 is a flathead shaft structure which is similar to the aforementioned flathead shaft structure of the first force module 2, wherein the second resistance element 31 has a male shaft and a female shaft. A resistance is generated due to the interference between the male shaft and the female shaft when one of the male shaft and the female shaft rotates with respect to the other.

In other embodiments, the stopping element 14 is not limited to be disposed on the first connecting board 12 and may be disposed on at least one of the connecting board. The stopping element 53 is not necessary a notch but can be a set of protrusions formed on the main body 51 or other designs configured for limiting the rotation range of the rotating element 5.

When the rotating element 5 rotates in the first rotating direction D1, only the second force module 3 is actuated by the rotating element 5 and provides the second backward torque B1. When the rotating element 5 rotates in the second rotating direction D2, the first force module 2 and the second force module 3 are actuated by the rotating element and respectively provide the first forward torque A2 and the second forward torque B2. The main feature of the present invention is that the absolute value of the second backward torque B1 does not equal to the absolute value of the sum of the first forward torque A2 and the second forward torque B2.

The following table shows the common configuration of the resistance source of the first force module and the second force module and the forward torque and the backward torque under those configurations. The value of the torque generated by each of the resistance elements is represented in their following bracket.

| Embodiment | Resistance source of the first force module 2 | Resistance source of the second force module 3 | The backward torque generated when the rotating element rotates in the first rotating direction D1 | The forward torque generated when the rotating element rotates in the second rotating direction D2 |
| --- | --- | --- | --- | --- |
| 6 | Frictional washer set (X1) | One-way damper (Y1) | Y1 | X1 + Y1 |
| 2 | Flathead shaft structure (X2) | | Y1 | X2 + Y1 |
| 3 | Two-way damper (X3) | | Y1 | X3 + Y1 |

-continued

| Embodiment | Resistance source of the first force module 2 | Resistance source of the second force module 3 | The backward torque generated when the rotating element rotates in the first rotating direction D1 | The forward torque generated when the rotating element rotates in the second rotating direction D2 |
|---|---|---|---|---|
| 7 | Frictional washer set (X1) | flathead shaft structure (Y2) | Y2 | X1 + Y2 |
| 8 | Flathead shaft structure (X2) | | Y2 | X2 + Y2 |
| 9 | Two-way damper (X3) | | Y2 | X3 + Y2 |
| 10 | Frictional washer set (X1) | Frictional washer set (Y3) | Y3 | X1 + Y3 |
| 11 | Flathead shaft structure (X2) | | Y3 | X2 + Y3 |
| 12 | Two-way damper (X3) | | Y3 | X3 + Y3 |
| 1 | Frictional washer set (X1) | Two-way damper (Y4) | Y4 | X1 + Y4 |
| 13 | flathead shaft structure (X2) | | Y4 | X2 + Y4 |
| 14 | Two-way damper (X3) | | Y4 | X3 + Y4 |

As shown in the foregoing table, the backward torque is the resistance provided by the second force module 3 when the rotating element 5 rotates in the first rotating direction D1.

The forward torque is determined by both the first force module 2 and the second force module 3, that is, the forward torque is co-provided by the first force module 2 and the second force module 3. If the second resistance element 31 is the one-way damper, the absolute value of the forward torque generated by the one-way damper is zero when the rotating element 5 rotates in the second rotating direction D2. If the second resistance element 31 is the frictional washer set or the flathead shaft structure or the two-way damper, the absolute value of the forward torque generated by the second resistance element 31 is not zero when the rotating element 5 rotates in the second rotating direction D2.

Accordingly, the supporting stand of the present invention can be adjusted according to the torque generated when rotating the rotating element in two opposite directions. The feeling for rotating the rotating element in opposite directions may be more variable for meeting the needs in various situations.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A supporting stand for supporting a panel, comprising:
a base including a bottom board and a first connecting board disposed on the bottom board;
a first force module being disposed on the first connecting board and including a mandrel;
a one-way bearing including a shaft hole in which the mandrel is disposed;
a rotating element being connected to the one-way bearing and the panel, making the panel be capable of rotating around the mandrel in a first rotating direction or a second rotating direction opposite to the first rotating direction;
a second force module being disposed on the base and actuating along with the rotating element;
wherein the first force module provides a first forward torque and the second force module provides a second forward torque to the rotating element when the panel and the rotating element rotate in the second rotating direction, and when the panel and the rotating element rotate in the first rotating direction, the one-way bearing refrains the first force module from providing a first backward torque, and the second force module is able to provide a second backward torque to the rotating element.

2. The supporting stand as claimed in claim 1, wherein an absolute value of a sum of the first forward torque and the second forward torque is not equal to an absolute value of the second backward torque.

3. The supporting stand as claimed in claim 2, wherein:
the one-way bearing further includes an outer ring portion and an inner ring portion disposed in the outer ring portion, wherein the shaft hole of the one-way bearing is formed on the inner ring portion, the outer ring portion of the one-way bearing is secured to the rotating element, and the inner ring portion is engaged with the first force module;
the inner ring portion is static and the outer ring portion rotates in the first rotating direction with respect to the inner ring portion when the rotating element rotates in the first rotating direction so that the first force module is refrained from providing the first backward torque to the rotating element; and
the inner ring portion and the outer ring portion of the one-way bearing simultaneously rotate in the second rotating direction when the rotating element rotates in the second rotating direction.

4. The supporting stand as claimed in claim 3, wherein the first force module further includes a shaft sleeve disposed on the mandrel, wherein the shaft sleeve has an outer contour embedding with an inner contour of the shaft hole for engaging the shaft sleeve with the shaft hole.

5. The supporting stand as claimed in claim 4, wherein the base further includes a stopping element, and the rotating element further includes a first stop end and a second stop end, wherein the rotating element is located at a first position when the rotating element rotates in the first rotating direction until the first stop end abuts against the stopping element, and the rotating element is located at a second position when the rotating element rotates in the second rotating direction until the second stop end abuts against the stopping element so that the rotating element is able to rotate and stop at any position between the first position and the second position.

6. The supporting stand as claimed in claim 5, further comprising a cover board being secured to the rotating element for connecting the one-way bearing to the rotating element without shifting from an axis with respect to the rotating element.

7. The supporting stand as claimed in claim 6, wherein the rotating element further includes a coupling shaft aligning with the axis and connecting to the second force module for making the second force module be actuated along with the rotating element.

8. The supporting stand as claimed in claim 7, wherein the rotating element further includes a supporting body for supporting the panel.

9. The supporting stand as claimed in claim 6, wherein the base further comprises a second connecting board disposed on the bottom board and spaced apart from the first connecting board, wherein the second force module is disposed on the second connecting board.

10. The supporting stand as claimed in claim 1, wherein the first force module further includes a first resistance element connecting to the mandrel, and the second force module further includes a second resistance element actuating along with the rotating element.

11. The supporting stand as claimed in claim 10, wherein the first resistance element is a frictional washer set or a two-way damper.

12. The supporting stand as claimed in claim 10, wherein the second resistance element is a frictional washer set, or a one-way damper, or a two-way damper, or a flathead shaft structure.

13. The supporting stand as claimed in claim 1, wherein the mandrel is a flathead shaft structure, and the second force module includes a second resistance element actuated together with the rotating element.

14. The supporting stand as claimed in claim 13, wherein the second resistance element is a frictional washer set, or a one-way damper, or a two-way damper, or a flathead shaft structure.

15. A supporting stand for supporting a panel on a working surface, the supporting stand comprising:
a base including a first supporting surface, a second supporting surface, and a first connecting board disposed on the first supporting surface and the second supporting surface, wherein the first supporting surface and the working surface include a first angle, and the second supporting surface and the working surface include a second angle which is unequal to the first angle;
a first force module being disposed on the first connecting board and including a mandrel;
a one-way bearing including a shaft hole in which the mandrel is disposed;
a rotating element being connected to the one-way bearing and the panel, making the panel be capable of rotating around the mandrel in a first rotating direction or a second rotating direction opposite to the first rotating direction; and
a second force module being disposed on the base and actuating along with the rotating element;
wherein the first force module provides a first forward torque and the second force module provides a second forward torque to the rotating element when the panel and the rotating element rotate in the second rotating direction, and when the panel and the rotating element rotate in the first rotating direction, the one-way bearing refrains the first force module from providing a first backward torque, and the second force module is able to provide a second backward torque to the rotating element.

16. The supporting stand as claimed in claim 15, wherein an absolute value of a sum of the first forward torque and the second forward torque is not equal to an absolute value of the second backward torque.

17. The supporting stand as claimed in claim 16, wherein:
the one-way bearing further has an outer ring portion and an inner ring portion disposed in the outer ring portion; wherein the shaft hole of the one-way bearing is formed on the inner ring portion, the outer ring portion of the one-way bearing is secured to the rotating element, and the inner ring portion is engaged with the first force module;
the inner ring portion is static and the outer ring portion rotates in the first rotating direction with respect to the inner ring portion when the rotating element rotates in the first rotating direction so that the first force module is refrained from providing the first backward torque to the rotating element; and
the inner ring portion and the outer ring portion of the one-way bearing simultaneously rotate in the second rotating direction when the rotating element rotates in the second rotating direction.

18. The supporting stand as claimed in claim 17, wherein the first force module further includes a shaft sleeve disposed on the mandrel, wherein the shaft sleeve has an outer contour embedding with an inner contour of the shaft hole for engaging the shaft sleeve with the shaft hole.

19. The supporting stand as claimed in claim 18, wherein the base further includes a stopping element, and the rotating element further includes a first stop end and a second stop end, wherein the rotating element is located at a first position when the rotating element rotates in the first rotating direction until the first stop end abuts against the stopping element, and the rotating element is located at a second position when the rotating element rotates in the second rotating direction until the second stop end abuts against the stopping element so that the rotating element is able to rotate and stop at any position between the first position and the second position.

20. The supporting stand as claimed in claim 19, further comprising a cover board being secured to the rotating element for connecting the one-way bearing to the rotating element without shifting from an axis with respect to the rotating element.

* * * * *